(12) United States Patent
Zhao et al.

(10) Patent No.: US 7,670,972 B2
(45) Date of Patent: Mar. 2, 2010

(54) CHALCOGENIDE GLASS COMPOSITION

(75) Inventors: Jing Zhao, Winchester, MA (US); Maohe Li, Lowell, MA (US)

(73) Assignee: Agiltron, Inc., Woburn, MA (US)

( * ) Notice: Subject to any disclaimer, the term of this patent is extended or adjusted under 35 U.S.C. 154(b) by 231 days.

(21) Appl. No.: 11/977,507

(22) Filed: Oct. 25, 2007

(65) Prior Publication Data

US 2008/0269044 A1 Oct. 30, 2008

Related U.S. Application Data

(60) Provisional application No. 60/924,069, filed on Apr. 30, 2007.

(51) Int. Cl.
*C03C 3/32* (2006.01)
*C03C 13/04* (2006.01)

(52) U.S. Cl. .......................................... 501/40; 501/37

(58) Field of Classification Search .................... 501/37, 501/40
See application file for complete search history.

(56) References Cited

U.S. PATENT DOCUMENTS

| | | | |
|---|---|---|---|
| 2,883,294 A | 4/1959 | Jerger, Jr. | |
| 3,413,187 A | 11/1968 | Krause et al. | |
| 4,708,942 A | 11/1987 | Nishii et al. | |
| 4,801,442 A | 1/1989 | Nishii et al. | |
| 5,346,523 A | 9/1994 | Sugai et al. | |
| 6,503,859 B1 | 1/2003 | Aitken | |
| 6,526,782 B1 | 3/2003 | Mossadegh et al. | |
| 6,756,333 B2 | 6/2004 | Aitken | |
| 6,984,598 B1 | 1/2006 | Hilton, II | |
| 6,993,230 B2 | 1/2006 | Sanghera et al. | |
| 7,157,390 B1 | 1/2007 | Hilton, II | |
| 7,190,875 B2 | 3/2007 | Anderson et al. | |

FOREIGN PATENT DOCUMENTS

SU 1100253 * 6/1984

OTHER PUBLICATIONS

Kokorina, "Glasses for Infrared Optics," CRC Press, pp. 207-213, 1996.
Webber et al., "Some Physical Properties of Ge-As-Se Infrared Optical Glasses," Journal of Non-Crystalline Solids, vol. 20, No. 2, pp. 271-283, Mar. 1976.
Aio et al., "Refractive Index of Chalcogenide Glasses over a Wide Range of Compositions," Journal of Non-Crystalline Solids, vol. 27, No. 3, pp. 299-307, Mar. 1978.
Graham et al., "Low-Cost Infrared Glass for IR Imaging Applications," Proceedings of SPIE, vol. 5078, No. 1, pp. 216-224, Apr. 2003.
Lukic et al., "Thermal Stability and Thermomechanical Characteristics of Cu-As-S-Se Glasses," Journal of Non-Crystalline Solids, vol. 326-327, pp. 83-71, Oct. 2003.
Aitken, "GeAs Sulfide Glasses with Unusually Low Network Connectivity," Journal of Non-Crystalline Solids, vol. 345-346, pp. 1-6, Oct. 2004.
Guimond et al., "Umicore Opens New Era in IR Moulded Optics by Opening the First High Volume Facility," Proceedings of SPIE, vol. 5783, No. 1, pp. 849-855, Mar. 2005.

* cited by examiner

*Primary Examiner*—Karl E Group
(74) *Attorney, Agent, or Firm*—Michael Crilly, Esq.

(57) ABSTRACT

A chalcogenide glass composition composed of arsenic (As), selenium (Se), sulfur (S), and antimony (Sb) is presented. The composition includes arsenic in the range from 25% to 45% by weight relative to the total weight of the composition, selenium in the range from 40% to 65% by weight relative to the total weight of the composition, sulfur in the range from 2% to 15% by weight relative to the total weight of the composition, and antimony in the range from 0% to 15% by weight relative to the total weight of the composition. The variability of constituents on a weight basis is greater than the related arts, thus facilitating a broader range of design options. The glass composition is preferred to have a thermal expansion coefficient of about $23.6 \times 10^{-6}/°$ C., a temperature coefficient of refractive index less than about $1 \times 10^{-6}/°$ C., a glass transition temperature less than 200 degrees Celsius, and/or a glass softening temperature less than 250 degrees Celsius. The present invention has immediate applicability within infrared sensors, infrared imaging devices, lasers, and fiber optic components, one example being amplifiers.

17 Claims, No Drawings

US 7,670,972 B2

CHALCOGENIDE GLASS COMPOSITION

CROSS REFERENCE TO RELATED APPLICATIONS

This application is based upon and claims priority under 35 U.S.C. § 119(e) from U.S. Provisional Application No. 60/924,069 filed Apr. 30, 2007, entitled Moldable IR Chalcogenide Glass, the contents of which are hereby incorporated in its entirety by reference thereto.

FEDERALLY SPONSORED RESEARCH AND DEVELOPMENT

None.

FIELD OF THE INVENTION

The present invention generally relates to chalcogenide glass compositions which are infrared transparent and formable via hot pressing methods. Specifically, compositions are composed of arsenic (As), selenium (Se), sulfur (S), and antimony (Sb) in weight proportions which ensure a thermal expansion coefficient which minimizes mismatch between an optical element and a mold therefore during manufacture, a temperature coefficient of refractive index which minimizes thermal defocusing effects, and glass transition and softening temperatures compatible with hot pressing methods understood in the art.

BACKGROUND OF THE INVENTION

The high cost of optical elements applicable to the infrared band remains an ongoing challenge. The cost of optical elements is determined in part by the price of constituents composing such elements, processing methods required to form the constituents into ingots, and fabrication processes required to properly manufacture precision optical elements from ingots. For example, infrared lenses are typically fabricated from single-crystal germanium, a costly elemental material. Single-crystal forms of germanium are produced via costly growth processes. Furthermore, single-crystal germanium is shaped to form optical lenses via cumbersome and costly mechanical methods, including cutting, grinding, polishing, and edging, the latter ensuring both optical and mechanical axes are properly aligned. Complex lens designs require even more expensive manufacturing methods, one example being the single-point-diamond method.

Chalcogenide glass compositions are broadly described as amorphous systems composed of one or more group VI elements, examples including sulfur (S), selenium (Se), and tellurium (Te), and one or more group III, IV, and/or V elements, examples including arsenic (As), germanium (Ge), antimony (Sb), tin (Sn), and gallium (Ga), having applicability to infrared optical elements. Compositions have low characteristic vibration frequencies allowing transmission far into the infrared region and band passes from the visible to 15 microns. Chalcogenide compositions may be melt processed to form glass ingots rather than grown to form costly crystals. As such, chalcogenide compositions facilitate the manufacture of netshape long wavelength infrared (LWIR) lenses via melt processes rather than mechanical methods. Netshape manufacturing methods offer significant economic and ecological advantages over multi-step mechanical processes because of the elimination of intermediate manufacturing steps and waste materials.

Several chalcogenide glass compositions have been developed for use as infrared optical components fabricated via hot pressing processes; however, several significant deficiencies are inherent to such compositions. Most compositions are composed of one or more costly elements, including germanium. Compositions have a relatively high glass softening temperature requiring processing at elevated temperatures, typically 320 to 500 degrees Celsius, which further increases manufacturing costs and difficulty. Compositions have a thermal expansion coefficient which differs from molds used in hot pressing processes, thus causing mismatch between lens surface and mold during cool down resulting in an improperly shaped lens. Compositions have a thermal coefficient of refractive index on the order of $10^{-5}/°C$., which is indicative of temperature sensitive performance.

Another problem within the related arts includes the limited design options afforded by germanium-free compositions. For example, Hilton, in U.S. Pat. No. 7,157,390, describes and claims a composition composed of arsenic and selenium with a 4% range of variation on a weight basis for each of the two constituents. Optical designs in general would benefit from the development of a variety of infrared glasses with different refractive indexes while maintaining desired thermal expansion coefficient and thermal coefficient of refractive index values.

Presently, the problems related to the mismatch between the coefficients of thermal expansion for known chalcogenide glass compositions and hot pressing molds are extremely difficult and costly to solve. The shrinkage of a lens within a mold is a very complicated process with no practical theory to estimate the effect. As such, an iterative process is applied including the steps of fabricating a mold, manufacturing a lens with the mold, measuring the resultant lens to determine its deviation with the required design, and redesigning the mold to compensate for observed deviations. Typically, the process requires numerous iterations before a mold yields the desired lens. Accordingly, the problems described above are minimized when the coefficient of thermal expansion for both glass composition and mold are comparable and avoided when they are identical.

It may be appreciated, therefore, that there remains a need for further advancements and improvements thus enabling the manufacture of thermally-stable, infrared optical elements.

Accordingly, what is required is a low-cost, germanium-free chalcogenide glass composition having a thermal expansion coefficient compatible with molds commonly used with hot pressing processes, a temperature coefficient of refractive index which varies little with temperature and otherwise referred to herein as near zero, a low glass transition temperature, and a low glass softening temperature.

What is also required are chalcogenide glass compositions which provide a broader range of design options so as to achieve the desired optical performance for an optical design while maintaining a thermal expansion coefficient of $23.6 \times 10^{-6}/°C$. and a thermal coefficient of refractive index less than $1 \times 10^{-6}/°C$.

SUMMARY OF THE INVENTION

An object of the present invention is to provide a low-cost, germanium-free chalcogenide glass composition having a thermal expansion coefficient compatible with mold materials used with hot pressing processes, a thermal coefficient of refractive index on the order of or less than $10^{-6}/°C$., a low glass transition temperature, and a low glass softening temperature.

Another object of the present invention is to provide chalcogenide glass compositions which provide a broader range of design options so as to achieve desired optical performance from optical designs while maintaining a thermal expansion coefficient of $23.6 \times 10^{-6}/°$ C. and a refractive index less than $1 \times 10^{-6}/°$ C. In terms of the present invention, the variability of constituents on a weight basis is greater than the related arts, thus facilitating a broader range of design options.

The present invention is a chalcogenide glass composition including arsenic, selenium, sulfur, and antimony. In some embodiments of the present invention, the composition includes arsenic in the range from 25% to 45% by weight relative to the total weight of the composition, selenium in the range from 40% to 65% by weight relative to the total weight of the composition, sulfur in the range from 2% to 15% by weight relative to the total weight of the composition, and antimony in the range from 0% to 15% by weight relative to the total weight of the composition.

Preferred embodiments of the present invention have a thermal expansion of approximately $23.6 \times 10^{-6}/°$ C., a thermal coefficient of refractive index near zero which is defined as on the order of or less than $10^{-6}/°$ C., a glass transition temperature less than 200° C., and a softening temperature less than 250° C. Preferred softening temperatures permit the composition to be molded within a low-cost mold, one example being aluminum. Preferred thermal expansion coefficients minimize mismatch between the composition and a mold during the cool down cycle of a hot pressing process so that the resultant lens and mold shrink in a complimentary fashion. As such, shrinkage of the lens during cooling does not influence mold design. Preferred temperature coefficients of refractive index minimize thermal defocusing effects.

It will be appreciated by those skilled in the art that the description herein, including the disclosure provided by the illustrative claims section, is illustrative and explanatory of this invention, but is not intended to be restrictive thereof or limiting of the advantages, applications, and uses which can be achieved by this invention.

Two exemplary advantages are noteworthy.

Embodiments of the present invention facilitate the low-cost, netshape manufacture of simple and complex optical elements with applicability to sensors and imaging devices within the infrared band.

Embodiments of the present invention have greater thermal stability, thus enhancing imaging and sensing capabilities over a wide range of temperatures.

DETAILED DESCRIPTION OF THE INVENTION

The present invention includes glass compositions composed of arsenic, selenium, sulfur, and antimony in the proportion of 25% to 45% arsenic, 40% to 65% selenium, 2% to 15% sulfur, and 0% to 15% antimony on a weight basis. Arsenic and selenium are the primary components of each glass composition. In preferred embodiments, the arsenic content should be limited to the range from 30% to 40% and most preferably to the range from 32% to 38%. In preferred embodiments, the selenium content should be limited to the range from 45% to 60% and most preferably to the range from 50% to 55%.

Sulfur content facilitates adjustments to the temperature coefficient of refractive index which is inversely related to the proportion of sulfur. The addition of sulfur also influences the transparency bandwidth of the composition. Too much sulfur limits the transparency bandwidth to the mid-infrared region. Accordingly, the weight proportion of sulfur should be limited to the range from 2% to 15% depending on the weight fractions of arsenic, selenium, and antimony. In preferred embodiments, the sulfur content should be limited to the range from 4% to 10%. In most preferred embodiments, the sulfur content should be limited to the range from 5% to 7%.

Antimony content facilitates adjustments to the thermal expansion coefficient, glass transition temperature, and softening temperature. The glass transition temperature is preferred to be less than 200 degrees Celsius. Accordingly, the weight proportion of antimony should be limited to the range from 0% to 15% depending on the weight fractions of arsenic, selenium, and sulfur. In preferred embodiments, the antimony content should be limited to the range from 1% to 10%. In most preferred embodiments, the antimony content should be limited to the range from 3% to 7%. The weight fractions identified above also allow for other preferred properties including a softening temperature less than 250 degrees Celsius, a thermal expansion coefficient the same as or similar to that of aluminum or other mold materials, and a thermal coefficient of refractive index less than $1 \times 10^{-6}/°$ C. at infrared wavelength of 10 microns. Antimony content may be increased to cause a corresponding change in the softening temperature.

In accordance with the embodiments above, other preferred embodiments of the glass composition are composed of arsenic, selenium, sulfur, and antimony in the proportion of 30% to 40% arsenic, 45% to 60% selenium, 4% to 10% sulfur, and 1% to 10% antimony on a weight basis.

In accordance with the embodiments above, other most preferred embodiments of the glass composition are composed of arsenic, selenium, sulfur, and antimony in the proportion of 32% to 38% arsenic, 50% to 55% selenium, 5% to 7% sulfur, and 3% to 7% antimony on a weight basis.

TABLE 1 describes two exemplary glass compositions and corresponding properties, including glass transition temperature ($T_g$), glass dilatometric softening temperature ($T_{ds}$), thermal expansion coefficient ($\alpha$), and thermal coefficient of refractive index ($\beta$). Compositions may be fabricated via methods understood in the art.

TABLE 1

| Example | Composition (% wt) | | | | $T_g$ (° C.) | $T_{ds}$ (° C.) | $\alpha$ (/° C.) | $\beta$ (/° C.) |
| --- | --- | --- | --- | --- | --- | --- | --- | --- |
| | As | Se | S | Sb | | | | |
| 1 | 35.5 | 52.8 | 6.7 | 5.1 | 165 | 200 | $23.6 \times 10^{-6}$ | $<1 \times 10^{-6}$ |
| 2 | 38.8 | 54.4 | 6.8 | — | 160 | 195 | $23.6 \times 10^{-6}$ | |

The preferred properties, namely, glass transition temperature less than 200 degrees Celsius and softening temperature less than 250 degrees Celsius, allow glass ingots to be formed into optical elements, including lenses, via hot pressing methods understood in the art. For example, the glass transition and softening temperatures noted above allow for hot pressing methods utilizing molds composed of aluminum. Glass compositions having a preferred thermal expansion coefficient approximating that of aluminum ensure that the resultant optical element is a mirror image of the mold at room temperature.

From the foregoing description, one skilled in the art can easily ascertain the essential characteristics of this invention, and without departing from the spirit and scope thereof, can make various changes and modifications of the invention to adapt it to various usages and conditions.

The description above indicates that a great degree of flexibility is offered in terms of the invention. Although the present invention has been described in considerable detail with reference to certain preferred versions thereof, other versions are possible. Therefore, the spirit and scope of the appended claims should not be limited to the description of the preferred versions contained herein.

What is claimed is:

1. A chalcogenide glass composition which is infrared transparent comprising:
    (a) arsenic in the range from 25% to 45% by weight relative to the total weight of said composition;
    (b) selenium in the range from 40% to 65% by weight relative to the total weight of said composition;
    (c) sulfur in the range from 2% to 15% by weight relative to the total weight of said composition; and
    (d) antimony in the range from greater than 0% to 15% by weight relative to the total weight of said composition.

2. The chalcogenide glass composition of claim 1, wherein said arsenic is in the range from 30% to 40% by weight relative to the total weight of said composition.

3. The chalcogenide glass composition of claim 1, wherein said selenium is in the range from 45% to 60% by weight relative to the total weight of said composition.

4. The chalcogenide glass composition of claim 1, wherein said sulfur is in the range from 4% to 10% by weight relative to the total weight of said composition.

5. The chalcogenide glass composition of claim 1, wherein said antimony is in the range from 1% to 10% by weight relative to the total weight of said composition.

6. The chalcogenide glass composition of claim 1, wherein said arsenic is in the range from 32% to 38% by weight relative to the total weight of said composition.

7. The chalcogenide glass composition of claim 1, wherein said selenium is in the range from 50% to 55% by weight relative to the total weight of said composition.

8. The chalcogenide glass composition of claim 1, wherein said sulfur is in the range from 5% to 7% by weight relative to the total weight of said composition.

9. The chalcogenide glass composition of claim 1, wherein said antimony is in the range from 3% to 7% by weight relative to the total weight of said composition.

10. The chalcogenide glass composition of claim 1, wherein said composition having a thermal expansion coefficient of approximately $23.6 \times 10^{-6}/^\circ$ C.

11. The chalcogenide glass composition of claim 1, wherein said composition having a thermal coefficient of refractive index less than approximately $1 \times 10^{-6}/^\circ$ C.

12. A chalcogenide glass composition which is infrared transparent comprising:
    (a) arsenic in the range from 30% to 40% by weight relative to the total weight of said composition;
    (b) selenium in the range from 45% to 60% by weight relative to the total weight of said composition;
    (c) sulfur in the range from 4% to 10% by weight relative to the total weight of said composition; and
    (d) antimony in the range from 1% to 10% by weight relative to the total weight of said composition.

13. The chalcogemde glass composition of claim 12, wherein said composition having a thermal expansion coefficient of approximately $23.6 \times 10^{-6}/^\circ$ C.

14. The chalcogenide glass composition of claim 12, wherein said composition having a temperature coefficient of refractive index less than approximately $1 \times 10^{-6}/^\circ$ C.

15. A chalcogenide glass composition which is infrared transparent comprising:
    (a) arsenic in the range from 32% to 38% by weight relative to the total weight of said composition;
    (b) selenium in the range from 50% to 55% by weight relative to the total weight of said composition;
    (c) sulfur in the range from 5% to 7% by weight relative to the total weight of said composition; and
    (d) antimony in the range from 3% to 7% by weight relative to the total weight of said composition.

16. The chalcogenide glass composition of claim 15, wherein said composition having a thermal expansion coefficient of approximately $23.6 \times 10^{-6}/^\circ$ C.

17. The chalcogenide glass composition of claim 15, wherein said composition having a temperature coefficient of refractive index less than approximately $1 \times 10^{-6}/^\circ$ C.

* * * * *